US009275586B2

(12) United States Patent
Bae et al.

(10) Patent No.: US 9,275,586 B2
(45) Date of Patent: *Mar. 1, 2016

(54) VISIBLE LIGHT COMMUNICATION METHOD IN INFORMATION DISPLAY DEVICE HAVING LED BACKLIGHT UNIT AND THE INFORMATION DISPLAY DEVICE

(75) Inventors: Tae-Han Bae, Seoul (KR); Eun-Tae Won, Seoul (KR); Jae-Seung Son, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 622 days.

This patent is subject to a terminal disclaimer.

(21) Appl. No.: 13/560,870

(22) Filed: Jul. 27, 2012

(65) Prior Publication Data

US 2013/0027423 A1 Jan. 31, 2013

(30) Foreign Application Priority Data

Jul. 28, 2011 (KR) ........................ 10-2011-0075481

(51) Int. Cl.
*G09G 5/00* (2006.01)
*G09G 3/34* (2006.01)
*G06T 11/60* (2006.01)

(52) U.S. Cl.
CPC ............ *G09G 3/3413* (2013.01); *G09G 3/3426* (2013.01); *G06T 11/60* (2013.01); *G09G 2300/0426* (2013.01); *G09G 2340/14* (2013.01); *G09G 2354/00* (2013.01)

(58) Field of Classification Search
CPC ........................................................ G06T 11/60
USPC ......................................................... 345/619
See application file for complete search history.

(56) References Cited

U.S. PATENT DOCUMENTS

| 8,982,037 | B2* | 3/2015 | Lee et al. ....................... 345/102 |
| 2007/0024571 | A1* | 2/2007 | Maniam et al. ................ 345/102 |
| 2008/0066129 | A1* | 3/2008 | Katcher et al. ................. 725/109 |
| 2009/0175594 | A1* | 7/2009 | Ann et al. ......................... 386/95 |
| 2009/0213063 | A1* | 8/2009 | Shimura ........................ 345/102 |
| 2011/0063510 | A1* | 3/2011 | Lee et al. ....................... 348/563 |
| 2012/0075285 | A1* | 3/2012 | Oyagi et al. ................... 345/419 |
| 2013/0208027 | A1* | 8/2013 | Bae et al. ....................... 345/690 |
| 2014/0023378 | A1* | 1/2014 | Bae et al. ....................... 398/128 |

* cited by examiner

*Primary Examiner* — Javid A Amini

(57) ABSTRACT

A method provides additional information from a server to a visible light communication terminal through visible light communication in an information display device having a Light Emitting Diode (LED) backlight unit. To this end, if content data regarding an image output through a screen of an information display device is provided from a server, it is determined whether additional information regarding an object of the image is included in the content data, and if so, the additional information is acquired from the content data. The information display device controls light emission of an LED backlight unit of a display unit based on the additional information, thus performing visible light communication. As such, various additional information regarding an object of an image displayed at a particular position of a current screen of the information display device can be provided to a visible light communication terminal.

20 Claims, 12 Drawing Sheets

VISIBLE LIGHT COMMUNICATION METHOD IN INFORMATION DISPLAY DEVICE HAVING LED BACKLIGHT UNIT AND THE INFORMATION DISPLAY DEVICE

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jul. 28, 2011 and assigned Serial No. 10-2011-0075481, the entire disclosure of which is hereby incorporated by reference.

TECHNICAL FIELD OF THE INVENTION

The present disclosure generally relates to a visible light communication terminal and a method for controlling the same, and more particularly, to an apparatus and method for providing information to a visible light communication terminal by using an information display device using a Light Emitting Diode (LED) backlight unit.

BACKGROUND OF THE INVENTION

General visible light communication is performed by transmitting, at a transmitter, visible light using a Light Emitting Diode (LED), a Laser Diode (LD), etc., as a light source and processing, at a receiver, the visible light using a Photo Detector (PD), etc. As the light emission efficiency of the LED is improved and the cost thereof decreases, the LED has become common in use in the general-lighting market such as fluorescent lamps, glow lamps, etc., as well as the special-lighting market such as portable devices, display devices, vehicles, sign lamps, signboards, etc.

In particular, the market of large-size signboards is continuously growing. In the large-size signboard market, the market of signboards using large Liquid Crystal Display (LCD) screens is also growing. The signboard is also called a Digital Information Display (DID), a Digital Signage (DS), a Large Format Display (LFD), or the like. For example, the DID device, by integrating display and Information Technology (IT) functions into conventional functions of posts using paper media and unidirectional advertisements using broadcasting, innovates the paradigm of information delivery through bidirectional communication between users and providers, such that the DID device has been in the limelight in its effects and cost reduction in the long run when compared to conventional delivery media. Recent DID technology has expanded its business area to the exterior advertisement and three-dimensional (3D) fields, through which general public can easily access advertisement media to which the DID solution is applied.

Various information display devices having display units, as well as the DID device, adopt LEDs in Back Light Units (BLUs). Since the LEDs may also be used as light sources for visible light communication, research is needed on information display devices having convenient and various functions using the BLUs adopting the LEDs.

As the number of information display devices using the LEDs in the BLUs increases, visible light communication using the LEDs is being actively studied.

However, in the information display devices such as the DID device, the LED transmits visible light, thus operating as a visible light transmitter, but till now, any service using visible light communication has not been proposed.

Moreover, considering that information display devices as well as the DID device are gradually connected through a network, a relationship with a server for continuously updating a new material in and managing the DID device needs to be defined.

SUMMARY OF THE INVENTION

To address the above-discussed deficiencies of the prior art, it is a primary object to provide an apparatus and method for providing various additional information to a visible light communication terminal through visible light communication.

The present disclosure also provides an apparatus and method for operating as a visible communication device by using an LED backlight unit.

The present disclosure also provides an apparatus and method for providing additional information from a server to a visible light communication terminal through visible light communication.

According to an aspect of the present disclosure, there is provided a visible light communication method in an information display device comprising a Light Emitting Diode (LED) backlight unit. The visible light communication method includes receiving content data from a server, determining whether additional information regarding an object of an image displayed on the information display device is included in the received content data, separating the additional information from the content data if the additional information is included in the content data, and outputting the additional information in the form of a visible light signal through an LED the LED backlight unit corresponding to a position at which the object is displayed.

According to another aspect of the present disclosure, there is provided an information display device for visible light communication. The information display device includes a controller for determining whether additional information regarding an object of an image displayed on a display unit is included in content data received from a server, and separating and outputting image information and the additional information to be displayed through the display unit from the content data if the additional information is included in the content data, the display unit for displaying an image comprising at least one objects by using the image information, a Light Emitting Diode (LED) backlight unit comprising a plurality of LEDs positioned on a rear side of the display unit, and a backlight driver for outputting the additional information in the form of a visible light signal by controlling light emission of an LED corresponding to a position of the object under control of the controller.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
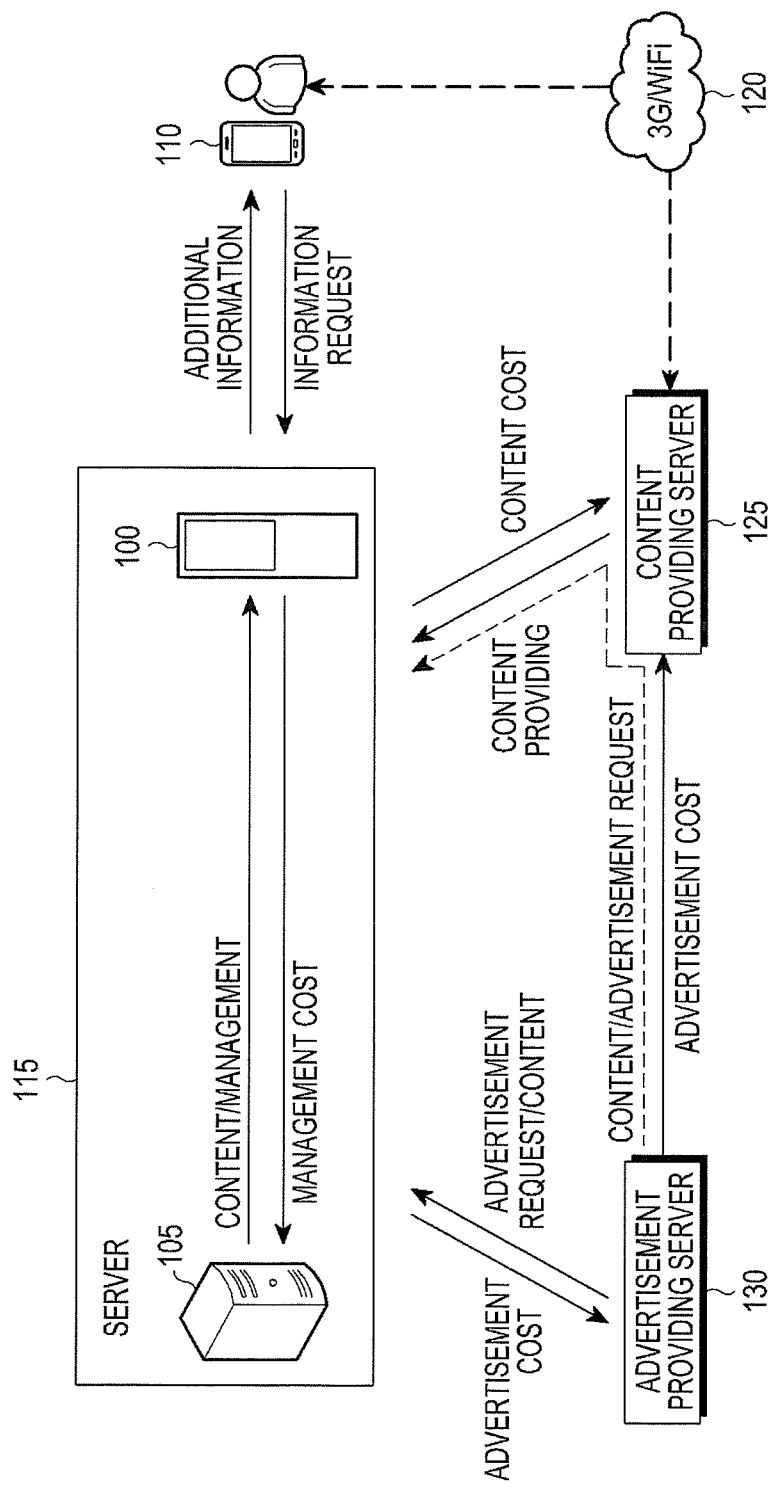
FIG. 1 illustrates a structural diagram of a system for providing additional information by using visible light communication according to an embodiment of the present disclosure.

FIGS. 1 through 10C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, an exemplary embodiment of the present disclosure will be described in detail with reference to the accompanying drawings. It should be noted that throughout the drawings, like components are referred to as like reference numerals. In the following description, a detailed description of known functions or configurations incorporated herein will be omitted when it may unnecessarily obscure the subject matter of the present disclosure.

In the following description, a representative embodiment of the present disclosure for achieving the aforementioned technical object will be provided. Although terms defined in visible communication will be used for convenience' sake, such standards and terms will not limit the scope of the present disclosure.

The present disclosure proposes a method for providing additional information from a server to a visible communication terminal through visible light communication, in an information display device having an LED backlight unit. To this end, in the present disclosure, once content data regarding an image output on a screen of the information display device is provided from the server, it is determined whether additional information regarding an object of the image is included in the content data, and if so, the additional information is acquired from the content data. The information display device controls light emission of the LED backlight unit of a display unit based on the additional information, thus achieving visible light communication. As such, according to the present disclosure, various additional information regarding an object of an image displayed at a particular position on the current screen of the information display device can be provided to the visible light communication terminal.

With reference to FIG. 1, a description will be made regarding components and operations of a system for providing additional information by using visible light communication, which has the above-described functions, according to the present disclosure.

Referring to FIG. 1, a visible light communication terminal 110 is provided with additional information from an information display device 100 through visible light communication. Management of and updating with new data of the information display device 100 may be performed by a server 105 which is an operator for providing content data to the information display device 100 and at the same time, managing additional information to be provided to a user. The server 105 manages one or more information display devices 100.

Herein, the additional information is information regarding an object of an image output through a screen of the information display device 100. The object may be in various forms such as a figure, an article, an icon, a mark, a sign, and so forth. The additional information includes an identifier of an object, control information such as a position of the object in an image for which the additional information is to be output, or the like, and detailed information about the object. A version of the additional information may be included as the detailed information about the object, such that the information display device 100 or the visible light communication terminal 110 is not provided with repetitive additional information.

Since there may be one or more objects in an image, in case of a presence of a plurality of objects, there may also be a plurality of additional information. Therefore, in this example, the additional information includes information indicating whether there is a plurality of additional information, and the content data may include a plurality of additional information in the form of a list. The additional information may also be information such as a Uniform Resource Locator (URL) indicating a position in which information regarding the object is stored. For example, when a product advertisement image is displayed on the screen of the information display device, the additional information includes detailed information about the product.

When the server 105 and the information display device 100 are managed by the same operator 115, then the operator 115 may affiliate with a separate advertisement providing server 130 and a content providing server 125. The operator (115) of the server 105 may be paid with an advertisement fee from the advertisement providing server 130, and may pay the content providing server 125 a content purchase cost. In this example, the visible light communication terminal 110 may be provided with URL access information through the additional information, such that the visible light communication terminal 110 can directly access the content providing server 125 over a 3G network or a WiFi 120. As such, a user of the visible light communication terminal 110 may be provided with visible additional information from the information display device 100 or request and receive additional information from the information display device 100.

In an embodiment of the present disclosure, a description will be focused on a relationship among the server 105, the information display device 100, and the visible light communication terminal 110. In the preset disclosure, any device having a display unit using an LED as a backlight unit, such as a Digital Information Display (DID), a Digital Signage (DS), a Large Format Display (LFD), or the like will be defined as an information display device.

Before undertaking a description of the present disclosure, a backlight unit of the information display device 100 will be described in brief with reference to FIG. 2.

A Liquid Crystal Display (LCD) is used as a display unit 200 of the information display device 100. To irradiate light from a rear surface of an LCD panel, a complex of a light source, a power circuit for driving the light source, and any accessory for achieving a uniform light sheet will be referred to as a Back Light Unit (BLU) 210. The BLU may include a plurality of Light Emitting Diodes (LEDs).

Since visible light communication uses an LED, if the LED of the BLU 210 of the information display device 100 is used as a light source, then the information display device 100 may operate as a transmission end of visible light communication without a separate LED for visible light communication. The structure of the information display device 100 capable of performing visible light communication will be described with reference to FIG. 2.

Figure 2:
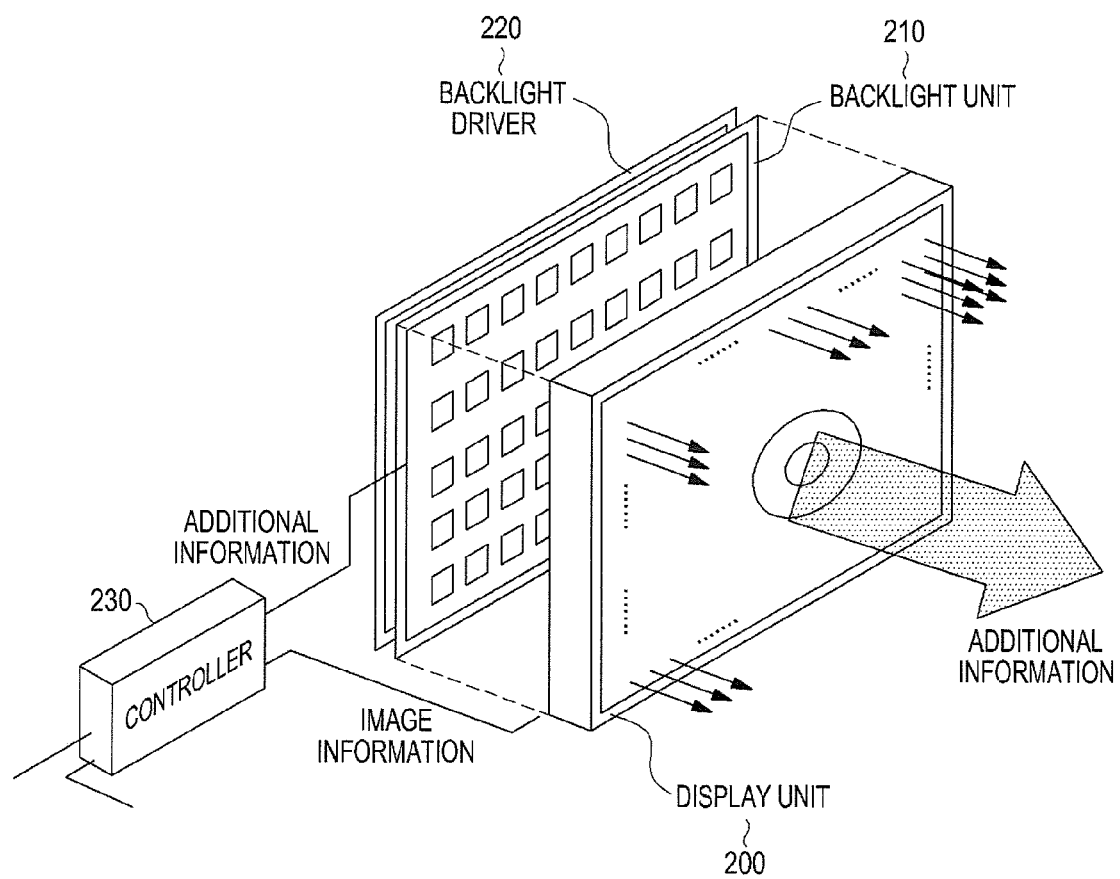
FIG. 2 illustrates an internal structure of an information display device according to an embodiment of the present disclosure, which is viewed from a side.

The structure as shown in FIG. 2 is a basic structure for visible light communication, and a visible light transmission function of the information display device 100 will be described below.

A controller 230 controls the overall function of the information display device 100, and may determine a transmission scheme and a modulation and encoding scheme for additional information to be transmitted through visible light communication. Control information for controlling transmission of the additional information may be provided from the server 105. The control information may be provided together with content data provided from the server 105.

If the content data from the server 105 is input to the information display device 100, the controller 230 determines whether additional information is included in the input content data and separates image information to be displayed through the display unit 200 and additional information to be transmitted through visible light communication from the content data. The controller 230 then delivers the additional information to a BLU driver 220. The BLU driver 220 drivers the LEDs based on the control information included in the additional information, thus transmitting the additional information in the form of visible light.

As mentioned above, the LEDs may be used as light sources for visible light communication, such that the information display device 100 can achieve visible light communication. The information display device 100 may further include a communication unit (not shown) for connection with the server 105. Examples of the communication unit may include a mobile communication module, a wireless Internet module, a short-range communication module, etc., which can transmit and receive wireless signals with the server 105 over a mobile communication network. The information display device 100 may request information from the server 105.

The information display device 100 may further include a light-receiving element for receiving a request for additional information from the visible light communication terminal 110. The light-receiving element may convert a visible light signal from the visible light communication terminal 110 into an electric signal. Examples of the light-receiving element may include an image sensor, a photo diode, and so forth. The information display device 100 may operate as a transmission end for visible light communication without any separate device, and when including a light-receiving element, it can also perform transmission/reception functions for visible light communication.

Herein, a transmission scheme for additional information may differ according to functions or conditions of the information display device 100, but the BLU driver 220 checks a position of additional information to be output through the screen and drives an LED at that position to transmit the additional information.

Figure 3:
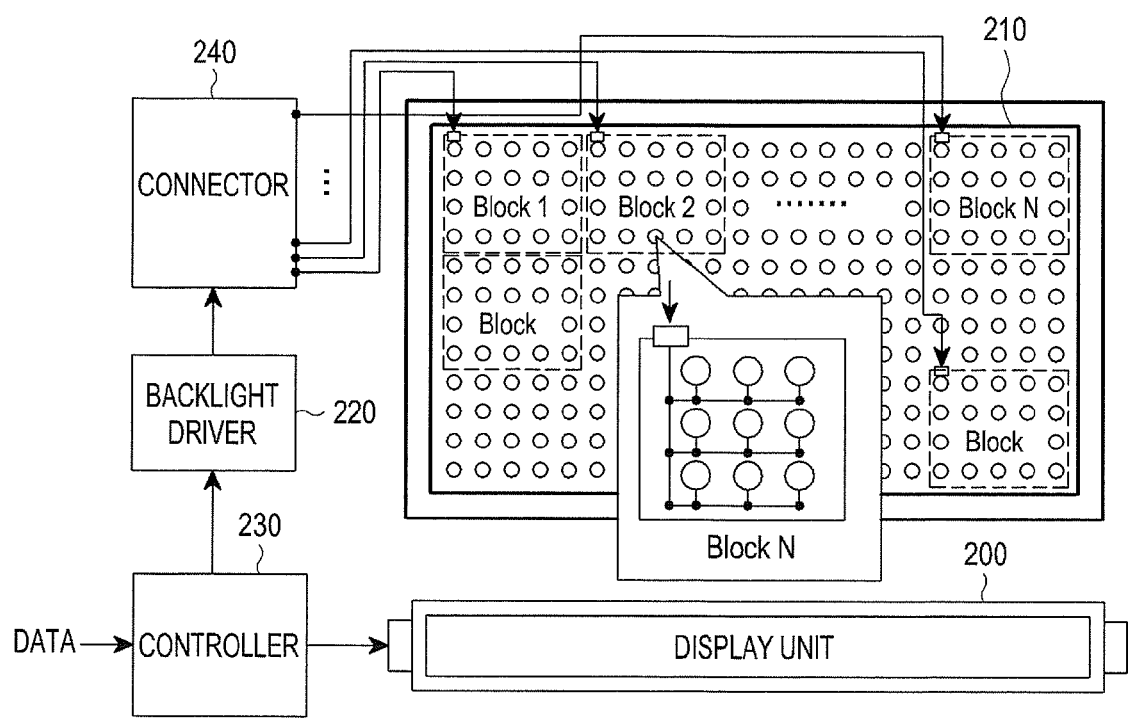
FIG. 3 illustrates a diagram for describing LED control in a backlight unit of a direct type according to an embodiment of the present disclosure.
Figure 4:
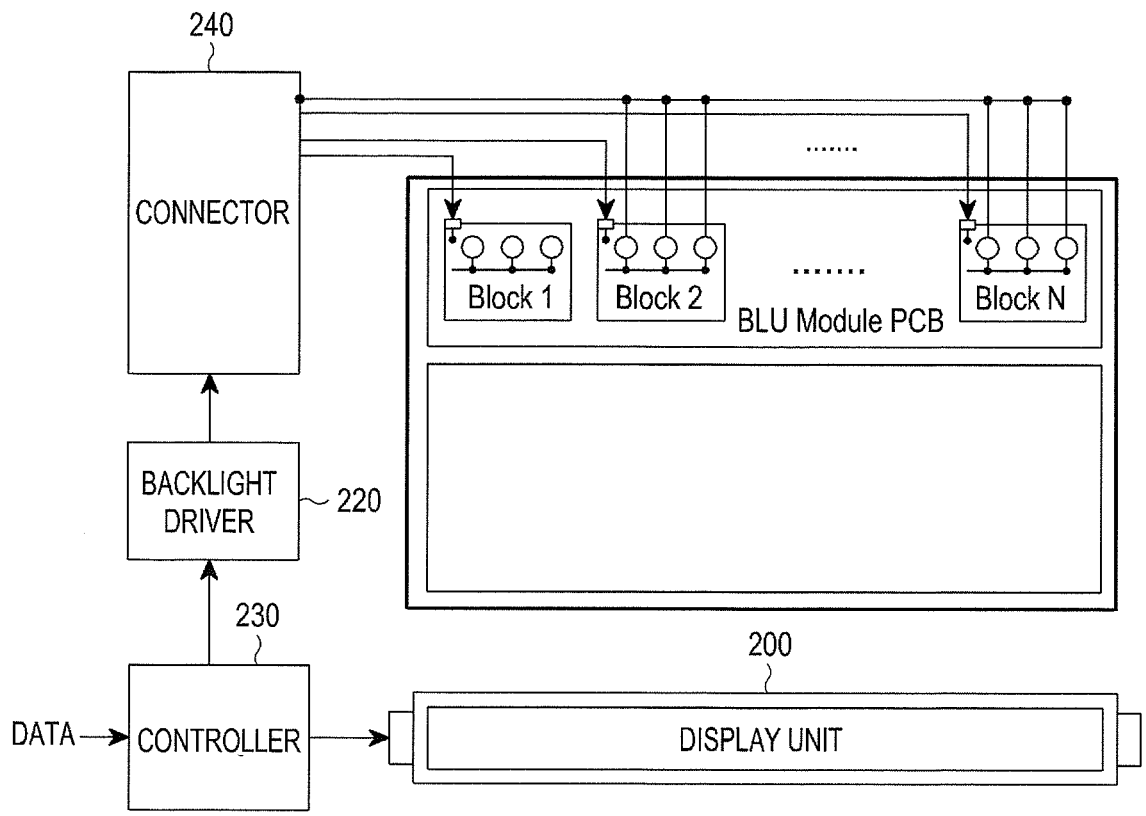
FIG. 4 illustrates a diagram for describing LED control in a backlight unit of an edge type according to an embodiment of the present disclosure.

The transmission scheme for the additional information is classified according to an LED arrangement method of the BLU 210. According to a form in which the LEDs are arranged relative to the LCD panel which is the display unit 200, the BLU 210 may be classified into a direct type and an edge type as shown in FIGS. 3 and 4.

The most distinct structural feature of the BLU 210 of the direct type is that the LEDs irradiating light to the LCD panel are arranged at positions for directly irradiating light from the back surface of the panel. Referring to FIG. 3, the LEDs are arranged in the shape of a checkerboard to form the BLU 210 of the direct type.

The most distinct structural feature of the BLU 210 of the edge type is that the LEDs are positioned on a side surface of the LCD panel. Light generated from the LEDs positioned on the side surface is irradiated to the LCD panel in the form of a light sheet through a light guide plate which delivers the generated light. When compared to the direct type, the edge type is favorable to slimmerization.

Control of the LEDs in the BLU 210 may use control of the individual LEDs one by one through the controller 230. However, taking account of increase in the cost of devices necessary for individual LED control and the complexity of the devices, most of current LCD products control the LEDs in units of a predetermined number of blocks as shown in FIGS. 3 and 4. However, the present disclosure is not limited to block-based LED control according to LED arrangement of the BLU 210, and even if LED arrangement is classified into the direct type and the edge type, the LEDs may be individually controlled in each type.

Upon input of the content data, the controller 230 separates the image information and the additional information in a process of processing the content data for output on the screen. The image information is delivered to the display unit 200, and the additional information is delivered to the BLU 210. According to the image information, the screen is configured and output, and the BLU 210 controls light emission of the LEDs through a connector 240. The connector 240 connects the LEDs grouped in blocks.

In the present disclosure, the LEDs of the BLU 210 are used for visible light communication, so that arrangement of the LEDs may have an influence upon visible light communication and may be determined as one of performance conditions of the information display device. For example, in the edge type, unlike in the direct type, it is difficult to transmit a desired visible light signal at a particular position on the screen.

Figure 5A:
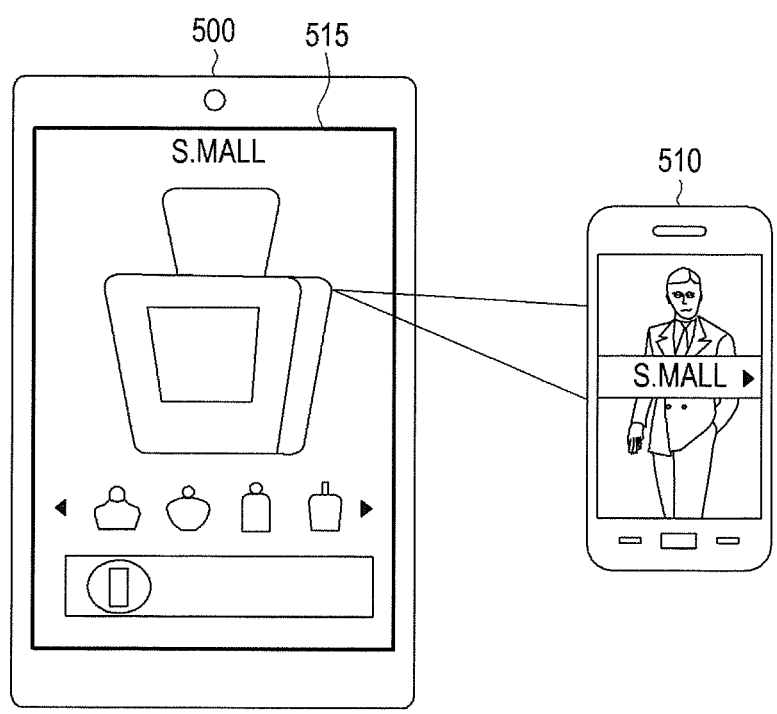
FIGS. 5A through 5C illustrate service models using LED driving schemes according to example embodiments of the present disclosure.
Figure 5B:
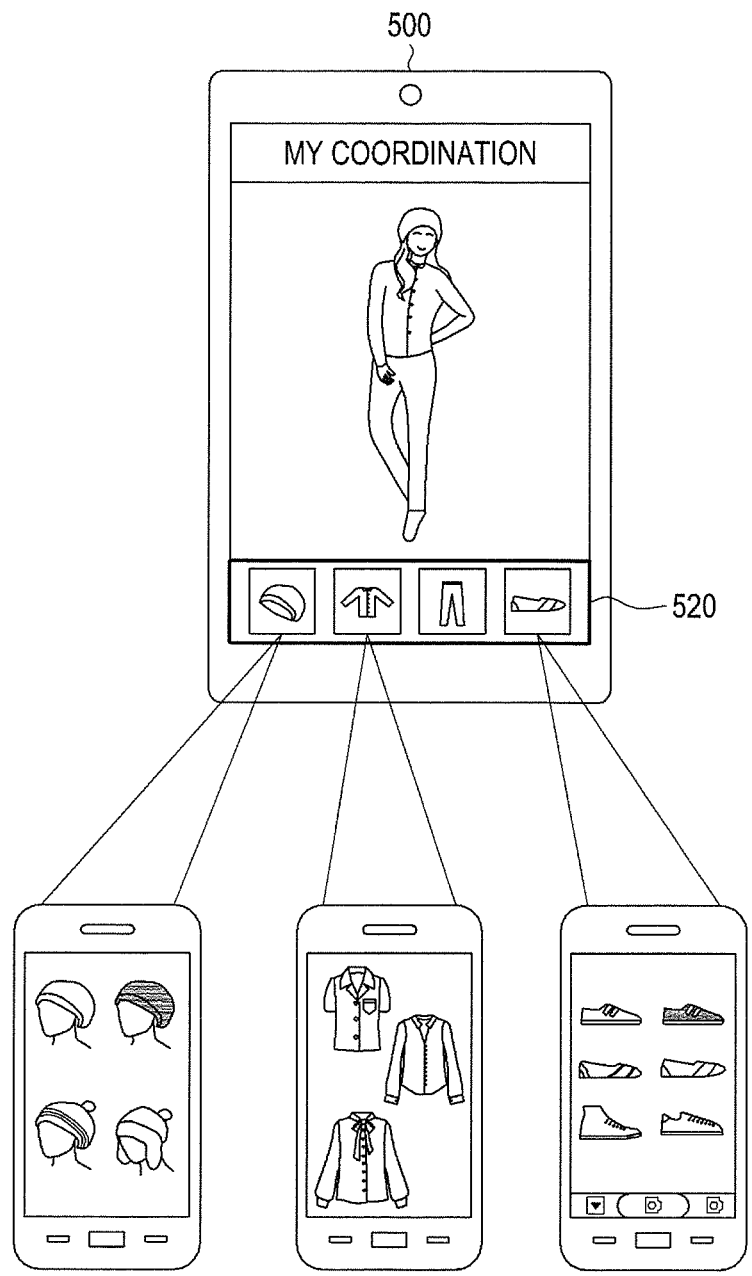
Figure 5C:
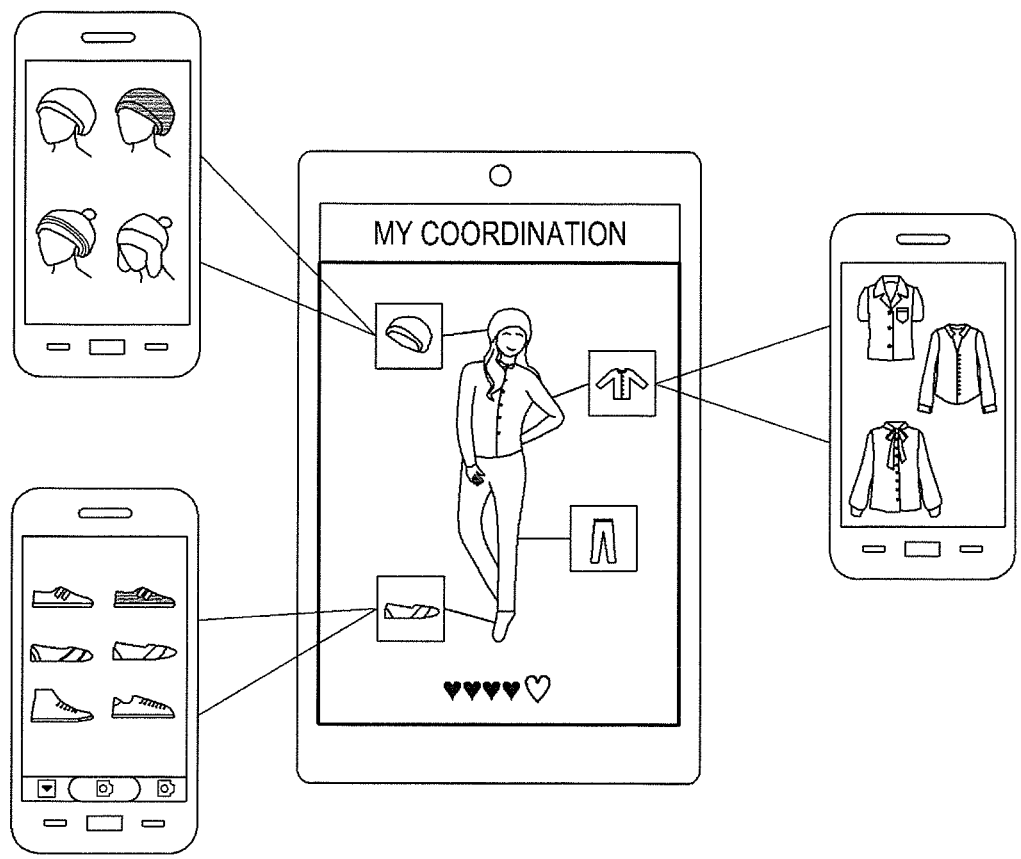

Therefore, a scheme for providing additional information from the information display device 100 to the visible light communication terminal 110 may also vary according to arrangement of the LEDs and a control scheme for the LEDs. FIGS. 5A through 5C show service models varying according to an LED driving scheme according to an embodiment of the present disclosure. Herein, according to whether the number of additional information is single or plural, it may be determined whether the LEDs would be driven collectively or the LEDs would be driven individually on a block basis.

FIG. 5A shows an example in which only single additional information can be provided. In this example, an information display device 500 may output additional information in the form of visible light through all the LEDs in the BLU, that is, a full screen 515. A visible light communication terminal 510, when being adjacent to the information display device 500, outputs a screen corresponding to provisioning of the additional information.

FIG. 5B shows an example in which a plurality of additional information may be provided, but positions at which the additional information is provided are fixed. In this example, the LEDs at predetermined positions 520 in the BLU are individually driven, thus outputting different additional information.

FIG. 5C shows an example in which positions at which a plurality of additional information is provided are variable. In this example, once the LEDs to be individually driven in the BLU are determined, the determined LEDs may output different additional information.

As such, the additional information provided from the server 105 is delivered to the visible light communication terminal 110 in the form of visible light through the information display device 100. At this time, communication messages may differ according to a relationship among the server 105, the information display device 100, and the visible light communication terminal 110.

Figure 6:
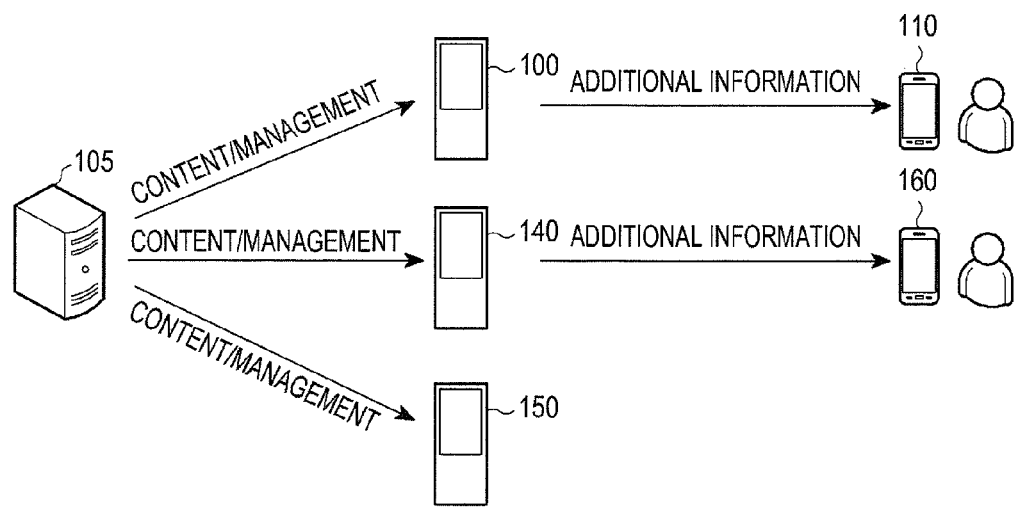
FIGS. 6 through 9 illustrate a relationship among a server, an information display device, and a visible light communication terminal to provide additional information according to an embodiment of the present disclosure.
Figure 7:
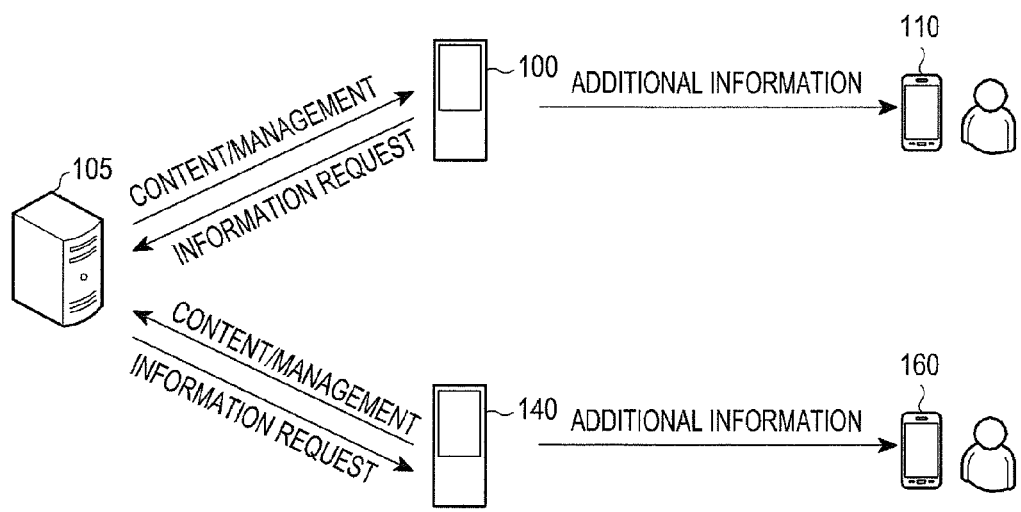

FIGS. 6 through 9 are diagrams showing a relationship among a server, an information display device, and a visible light communication terminal to provide additional information according to an embodiment of the present disclosure. At present, message delivery is performed mainly for communication between the information display device 100 and a general terminal. In this example, the information display device 100 repetitively transmits the same data. However, in an embodiment of the present disclosure, as shown in FIGS. 6 and 7, the information display device 100 is provided with content data from the server 105 and is managed by the server 105, such that new additional information can be provided to visible light communication terminals 110 and 160.

FIG. 6 illustrates a service model relationship diagram in which the server 105 manages a plurality of information display devices 100, 140, and 150. Communications between the server 105 and the information display devices 100, 140, and 150 are unidirectional, and the server 105 may continuously update information necessary for the respective information display devices 100, 140, and 150. Messages transmitted to the information display devices 100, 140, and 150 from the server 105 for management of the information display devices 100, 140, and 150 include items described below.

Messages transmitted to the information display devices 100, 140, and 150 include addresses of the information display devices 100, 140, and 150, conditions of the information display devices 100, 140, and 150, an additional information version, presence of additional information, the number of additional information, and an additional information list and other related information in case of a presence of a plurality of additional information, respectively.

First, an address of an information display device refers to an address of a building where the information display device is installed in case of a presence of a plurality of information display devices, and a location of the information display device in the building. A system or format of an address for this end is irrelevant to the present disclosure and thus will not be considered.

Conditions of an information display device include an identifier (ID) for identifying the information display device, an LED arrangement type, and conditions of a BLU.

An additional information version is a version number used to update additional information, and is used to update additional information such as change of data of the additional information or change of the additional information with new data.

Presence of additional information indicates whether or not the additional information is included in content data.

The number of additional information is used to identify whether the additional information is single or plural. In case of a plurality of additional information, an additional information list is also included in content data.

Other related information may include a position on a screen to which additional information is to be transmitted, a start time, an end time, a duration, and so forth.

The foregoing items may be changed into various forms according to the operating performance or communication direction of an information display device, such that they may also be differently applied to messages exchanged between the server 105 and the information display device 100.

FIG. 7 is a service model relationship diagram in which bidirectional communication is possible between the server 105 and several information display devices 100 and 140. When bidirectional communication is possible, the information display devices 100 and 140 may directly request additional information and be provided with content data including the additional information. To this end, the information display devices 100 and 140 transmit messages indicating their states to the server 105. The state indicating message includes an address indicating a location of the information display device 100 (or 140), an ID of the information display device 100 (or 140), and an LED BLU type of the information display device 100 (or 140).

As such, the information display devices 100 and 140 can perform bidirectional communication with the server 105, such that they may directly inform or update the server 105 of or with their current addresses, IDs, and conditions. In response, the server 105 provides customized address information corresponding to the states of the information display devices 100 and 140. More specifically, considering an LED BLU type, a position on a screen at which additional information is to be output and whether or not a plurality of additional information can be output may be determined, thus providing customized additional information.

As such, even when the states or conditions of the information display devices 100 and 140 are changed, any changes can be known automatically without a manager separately applying the changes to the server 105, thereby efficiently managing the information display devices 100 and 140.

Figure 8:
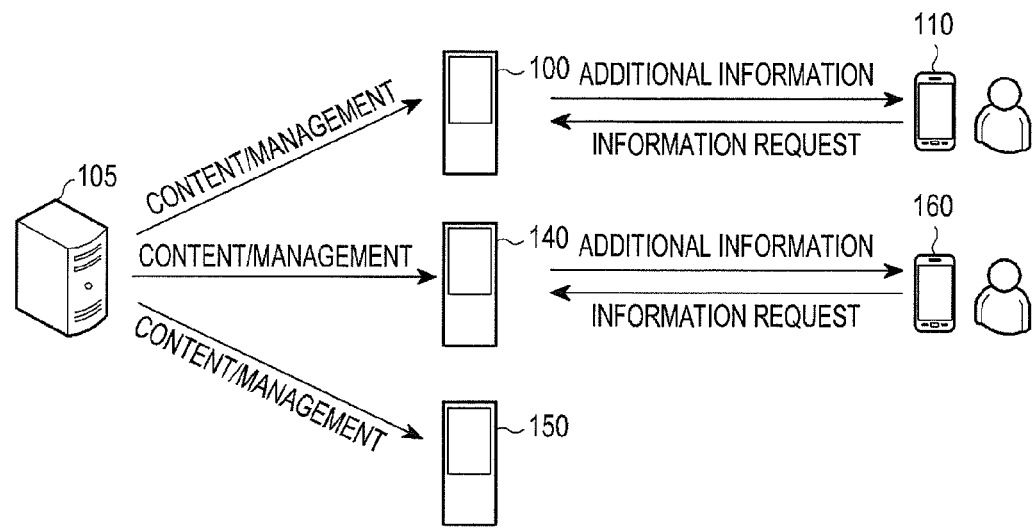

FIG. 8 is a service model relationship diagram when bidirectional communications are possible between the information display devices 100, 140, and 150 and the visible light communication terminals 110 and 160. As shown in FIG. 8, messages delivered to the information display devices 100, 140, and 150 from the server 105 are in forms similar to those in FIG. 6. The visible light communication terminals 110 and 160 may request information from the information display devices 100, 140, and 150, and in response to the information request, the information display devices 100, 140, and 150 may provide information through their own additional information.

Figure 9:
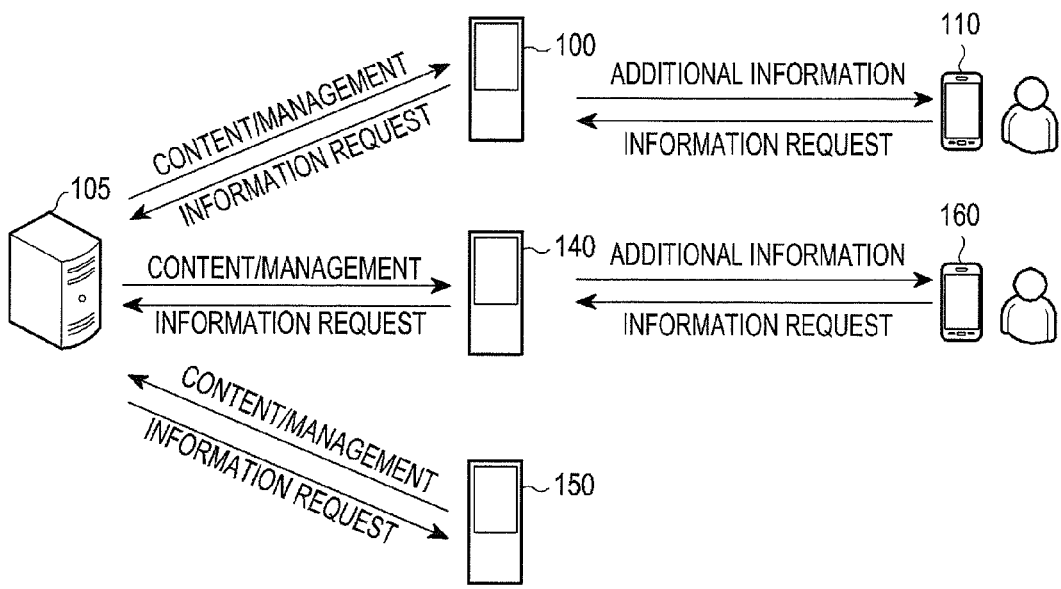

FIG. 9 illustrates a service model relationship diagram when bidirectional communications are possible both between the information display devices 100, 140, 150 and the visible light communication terminals 110 and 160 and between the server 105 and the visible light communication terminals 110 and 160. In this example, the information display devices 100, 140, and 150 may inform the server 105 of their states, and the server 105 may provide content data corresponding to their states to the information display devices 100, 140, and 150. The visible light communication terminals 110 and 160 may be provided with desired additional information in response to the information request.

Hereinafter, operations of information display devices according to the foregoing service models will be described with reference to FIGS. 10A through 10C.

Figure 10A:
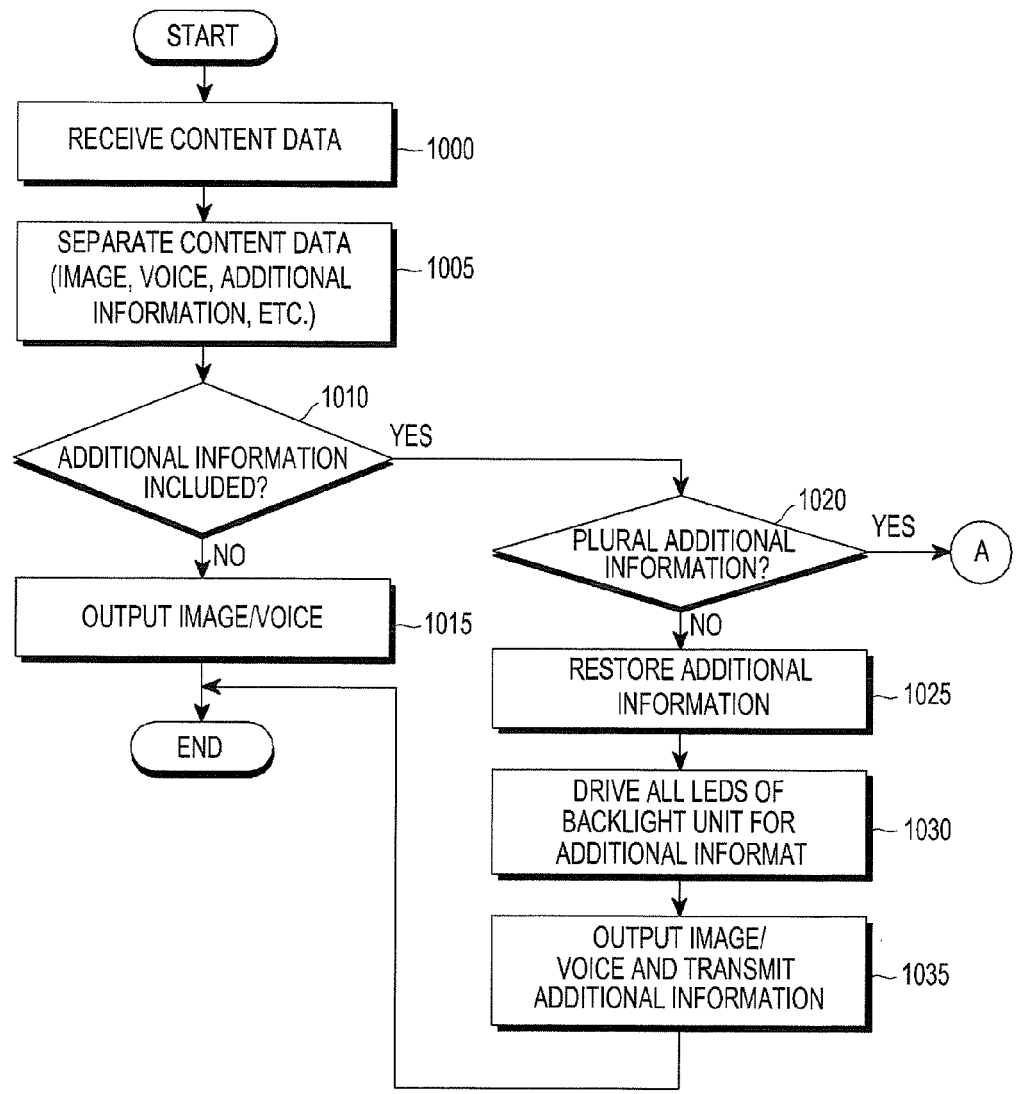
FIGS. 10A through 10C illustrate a process in an information display device to provide additional information according to an embodiment of the present disclosure.

Referring to FIG. 10A, an information display device, upon receiving content data from the server 105 in step 1000, separates the content data in step 1005. For example, the information display device decodes the content data into image or voice data. In this separation process, the information display device determines whether additional information is present in the content data in step 1010. When the additional information is absent, in step 1015, the information display device outputs an image and a voice by using the decoded image or voice data.

On the other hand, when the additional information is present, the information display device determines whether the number of additional information is plural in step 1020. If the number of additional information is single, the information display device restores the additional information in step 1025, thus acquiring control information related to the additional information. The information display device collectively drives all LEDs of a BLU based on the control information in step 1030 to output the additional information through a full screen area 515 as shown in FIG. 5A. Thus, in step 1035, the information display device outputs the image and the voice and at the same time, transmits the additional information in the form of visible light through all the LEDs.

If the number of additional information is plural in step 1020, a position at which the additional information is to be output differs according to a position variable LED individual driving scheme or a position fixed LED individual driving scheme. Herein, a symbol A is used to indicate that step 1020 of FIG. 10A is connected with step 1040 of FIG. 10B or step 1060 of FIG. 10C.

Figure 10B:
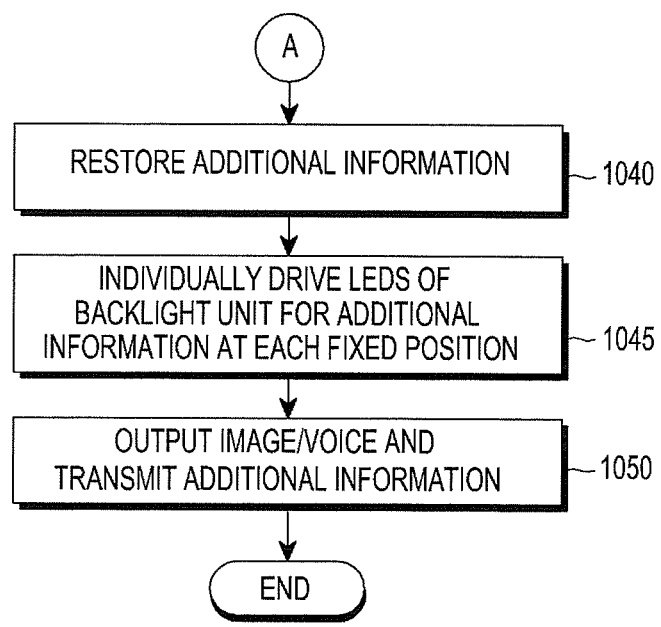

Thus, in case of the position fixed scheme as shown in FIG. 5B in step 1020, the process goes to step 1040 of FIG. 10B to restore the additional information. Thus, the information display device acquires information related to the additional information, e.g., an additional information list, a position on the screen at which the additional information is to be output, a start time, a duration, and an end time for the additional information, and so forth. In step 1045, the information display device individually drives the LEDs of the BLU for additional information at each fixed position. More specifically, light emission of each LED block corresponding to an output position of additional information is controlled, such that according to additional information, lighting or extinguishment of a corresponding LED block is differentially applied. In this way, the information display device outputs the image and the voice and transmits the additional information to a visible light communication terminal in step 1050.

Figure 10C:
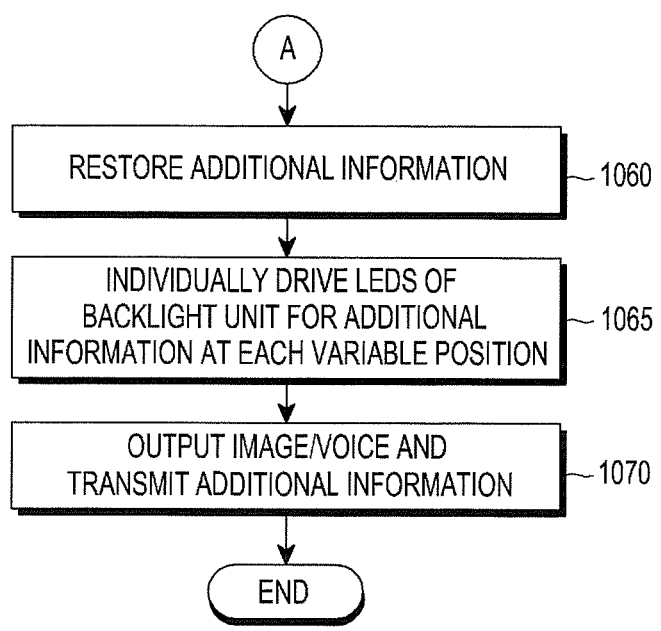

On the other hand, in case of the position variable scheme as shown in FIG. 5C in step 1020, the process goes to step 1060 of FIG. 10C to store additional information like in step 1040. In step 1065, the LEDs of the BLU are individually driven for additional information at each variable position. By controlling lighting or extinguishment of LED blocks, only an LED block corresponding to positions at which additional information is to be output is driven and an LED block corresponding to the other positions is not driven, such that delivery of additional information at each variable position is possible. In this way, the information display device outputs the image and the voice and transmits the additional information to a visible light communication terminal in step 1070.

As is apparent from the foregoing description, according to the present disclosure, an information display device operates as a visible light communication device by using an LED BLU, thereby providing additional information to a visible light communication terminal.

Moreover, the present disclosure defines a relationship between an information display device and a server, thereby providing various additional information from a server to a visible light communication terminal through visible light communication.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for visible light communication in an information display device comprising a Light Emitting Diode (LED) backlight unit, the method comprising:
    receiving, by the information display device, content data from a server;
    determining, by the information display device, whether additional information regarding an object of an image displayed on the information display device is included in the received content data;
    extracting, by the information display device, the additional information from the content data if the additional information is included in the content data; and
    outputting, by the information display device, the additional information in a form of a visible light signal through an LED in the LED backlight unit corresponding to a position at which the object is displayed.

2. The method of claim 1, wherein the additional information comprises at least one of an identifier of the object, a position of the object in the image for which the additional information is to be output, detailed information about the object, and a version of the additional information.

3. The method of claim 2, wherein determining whether the additional information is included comprises:
    determining, by the information display device, whether a plurality of additional information is included in the content data.

4. The method of claim 3, wherein outputting the additional information in the form of the visible light signal comprises:
    controlling, by the information display device, light emission of each LED corresponding to a position at which each additional information is to be output, if the plurality of additional information is included.

5. The method of claim 1, wherein outputting the additional information in the form of the visible light signal comprises:
    controlling, by the information display device, light emission of all LEDs in the LED backlight unit if single additional information is included.

6. The method of claim 1, further comprising:
    receiving, by the information display device, a request for information in a visible light form from the visible light communication terminal; and
    transmitting, by the information display device, a request for additional information corresponding to the information request to the server.

7. The method of claim 1, wherein the received content data comprises at least one of an address indicating a place where the information display device is located, an identifier for identifying the information display device, an image to be output through the screen, and the additional information.

8. The method of claim 1, further comprising:
transmitting a message indicating a state of the information display device to the server; and
receiving content data comprising customized additional information corresponding to the state of the information display device.

9. The method of claim 8, wherein the message indicating the state of the information display device comprises at least one an address indicating a location of the information display device, an identifier of the information display device, and a type of an LED backlight unit of the information display device.

10. The method of claim 1, wherein the additional information is Uniform Resource Locator (URL) information indicating a position at which information regarding the object is stored.

11. The method of claim 1, wherein the object is one of a figure, an article, an icon, a mark, and a symbol displayed on the image.

12. An information display device for visible light communication, the information display device comprising:
a controller configured to determine whether additional information regarding an object of an image displayed on a display unit is included in content data received from a server, and to extract image information and the additional information from the content data if the additional information is included in the content data and to output the additional information in a form of a visible light signal through an LED in the LED backlight unit corresponding to a position at which the object is displayed;
the display unit configured to display an image comprising at least one objects by using the image information;
a Light Emitting Diode (LED) backlight unit comprising a plurality of LEDs positioned on a rear side of the display unit; and
a backlight driver configured to output the additional information in a form of a visible light signal by controlling light emission of an LED corresponding to a position of the object under control of the controller.

13. The information display device of claim 12, wherein the additional information comprises at least one of an identifier of the object, a position of the object in the image for which the additional information is to be output, detailed information about the object, and a version of the additional information.

14. The information display device of claim 12, wherein the controller is configured to determine whether a plurality of additional information is included in the content data.

15. The information display device of claim 14, wherein the backlight driver is configured to control light emission of each of the at least one LEDs corresponding to a position at which each additional information is to be output, if the plurality of additional information is included.

16. The information display device of claim 12, wherein the backlight driver is configured to control light emission of all of the at least one LEDs in the LED backlight unit if single additional information is included.

17. The information display device of claim 12, further comprising a light-receiving element configured to receive a request for information in a visible light form from the visible light communication terminal.

18. The information display device of claim 17, wherein the controller, upon receiving the information request, is configured to transmit a message indicating a state of the information display device to the server and receive content data comprising customized additional information corresponding to the state of the information display device.

19. The information display device of claim 12, wherein the object is one of a figure, an article, an icon, a mark, and a symbol displayed on the image.

20. The information display device of claim 12, wherein the additional information is Uniform Resource Locator (URL) information indicating a position at which information regarding the object is stored.

* * * * *